US00RE47713E

(19) United States
(12) Reissued Patent
Morong et al.

(10) Patent Number: US RE47,713 E
(45) Date of Reissued Patent: *Nov. 5, 2019

(54) POWER CONVERTER WITH DEMAND PULSE ISOLATION

(71) Applicant: CogniPower, LLC, Malvern, PA (US)

(72) Inventors: William H. Morong, Paoli, PA (US); Thomas E. Lawson, Malvern, PA (US)

(73) Assignee: COGNIPOWER, LLC, Malvern, PA (US)

( * ) Notice: This patent is subject to a terminal disclaimer.

(21) Appl. No.: 15/168,998

(22) Filed: May 31, 2016

Related U.S. Patent Documents

Reissue of:
(64) Patent No.: 9,071,152
Issued: Jun. 30, 2015
Appl. No.: 13/923,394
Filed: Jun. 21, 2013

U.S. Applications:
(63) Continuation of application No. 15/090,929, filed on Apr. 5, 2016, now Pat. No. Re. 47,031, which is an application for the reissue of Pat. No. 9,071,152.

(60) Provisional application No. 61/667,473, filed on Jul. 3, 2012, provisional application No. 61/727,795, filed on Nov. 19, 2012.

(51) Int. Cl.
*H02M 3/335* (2006.01)

(52) U.S. Cl.
CPC ... *H02M 3/33523* (2013.01); *H02M 3/33507* (2013.01); *H02M 3/33515* (2013.01)

(58) Field of Classification Search
CPC ..... H02M 3/33523; H02M 3/33515; H02M 3/33507; H02M 2001/0016
USPC ..... 363/21.15
See application file for complete search history.

(56) References Cited

U.S. PATENT DOCUMENTS 3,321,685 A * 5/1967 Johannes ..... H02H 7/0833 318/400.22
3,889,173 A 6/1975 Klusmann et al.
4,119,103 A 10/1978 Jirak
4,209,847 A 6/1980 Noda et al.
4,438,486 A * 3/1984 Ferraro ..... H03K 17/08146 363/134
4,459,651 A 7/1984 Fenter
4,597,036 A 6/1986 Paulik et al.
4,758,937 A * 7/1988 Usui et al. ..... 363/19
4,937,727 A 6/1990 Leonardi
4,958,268 A * 9/1990 Nagagata et al. ..... H02M 3/33584 363/16
4,996,638 A 2/1991 Orr
(Continued)

FOREIGN PATENT DOCUMENTS

EP 2717499 A1 4/2014

OTHER PUBLICATIONS

Frank, R., et al. "LM3001/LM3101 A 1 MHz Off-Line PWM Controller Chipset with Pulse Communication for Voltage-Current- or Charge-Mode Control," 1994, National Semiconductor Application Note 918, pp. 1-8.

(Continued)

*Primary Examiner* — Anjan K Deb
(74) *Attorney, Agent, or Firm* — Mendelsohn Dunleavy, P.C.; Steve Mendelsohn

(57) ABSTRACT

The present invention provides a switched-mode power converter with regulation demand pulses sent across a galvanic isolation barrier.

44 Claims, 4 Drawing Sheets

(56) References Cited

U.S. PATENT DOCUMENTS

| | | | | |
|---|---|---|---|---|
| 5,161,022 | A * | 11/1992 | Ichimura | H02M 3/33507 348/725 |
| 5,498,995 | A * | 3/1996 | Szepesi | H02M 3/33507 327/101 |
| 5,642,267 | A | 6/1997 | Brkovic et al. | |
| 5,719,755 | A * | 2/1998 | Usui | 363/19 |
| 5,825,640 | A * | 10/1998 | Quigley | H03L 7/0895 363/60 |
| 5,973,945 | A | 10/1999 | Balakrishnan et al. | |
| 6,072,702 | A * | 6/2000 | Nakao et al. | 363/19 |
| 6,301,135 | B1 * | 10/2001 | Mammano | H02M 3/33523 363/132 |
| 6,456,511 | B1 | 9/2002 | Wong | |
| 6,504,267 | B1 | 1/2003 | Giannopoulos | |
| 6,563,718 | B1 | 5/2003 | Li et al. | |
| 6,738,267 | B1 | 5/2004 | Navas Sabater et al. | |
| 7,368,880 | B2 | 5/2008 | Lyle, Jr. et al. | |
| 7,450,402 | B2 * | 11/2008 | Jitaru | 363/20 |
| 7,835,163 | B2 | 11/2010 | Chou | |
| 7,876,583 | B2 | 1/2011 | Polivka et al. | |
| 8,000,115 | B2 | 8/2011 | Polivka et al. | |
| 8,125,799 | B2 | 2/2012 | Zhu et al. | |
| 8,243,477 | B2 | 8/2012 | Polivka et al. | |
| 8,823,353 | B2 | 9/2014 | Zhang et al. | |
| 8,976,561 | B2 | 3/2015 | Balakrishnan et al. | |
| 9,035,435 | B2 | 5/2015 | Balakrishnan et al. | |
| 9,083,251 | B2 | 7/2015 | Zhang et al. | |
| 9,178,411 | B2 | 11/2015 | Djenguerian et al. | |
| 9,246,392 | B2 | 1/2016 | Balakrishnan et al. | |
| 9,275,946 | B2 | 3/2016 | Balakrishnan et al. | |
| 9,374,019 | B2 | 6/2016 | Li et al. | |
| 10,008,942 | B1 * | 6/2018 | Horwitz | H02M 1/38 |
| 2005/0254266 | A1 * | 11/2005 | Jitaru | 363/16 |
| 2006/0267514 | A1 * | 11/2006 | Xu | H05B 33/0815 315/291 |
| 2007/0024254 | A1 | 2/2007 | Radecker et al. | |
| 2008/0181316 | A1 | 7/2008 | Crawley et al. | |
| 2008/0267212 | A1 | 10/2008 | Crawley et al. | |
| 2008/0278975 | A1 * | 11/2008 | Degen et al. | 363/21.18 |
| 2008/0310191 | A1 | 12/2008 | Zhu et al. | |
| 2010/0026268 | A1 | 2/2010 | Chang et al. | |
| 2010/0157630 | A1 | 6/2010 | Polivla et al. | |
| 2010/0231279 | A1 * | 9/2010 | Walker | H03K 5/15066 327/237 |
| 2011/0018590 | A1 | 1/2011 | Tai et al. | |
| 2011/0022867 | A1 * | 1/2011 | Chang | G06F 1/3218 713/323 |
| 2011/0026277 | A1 | 2/2011 | Strijker | |
| 2011/0096573 | A1 * | 4/2011 | Zhu et al. | H02M 3/33523 363/21.17 |
| 2011/0096578 | A1 * | 4/2011 | Fang et al. | 363/127 |
| 2012/0153921 | A1 | 6/2012 | Brokaw | |
| 2012/0281439 | A1 | 11/2012 | Polivka et al. | |
| 2013/0100710 | A1 | 4/2013 | Kang et al. | |
| 2013/0299841 | A1 | 11/2013 | Ranglack et al. | |
| 2016/0079877 | A1 | 3/2016 | Lin et al. | |

OTHER PUBLICATIONS

"Feedback Isolation Augments Power-Supply Safety and Performance," Jan. 22, 2001, Maxim, as retrieved from: https://www.maximintegrated.com/en/app-notes/index.mvp/id/664, 6 pages.

"Isolated Transformer Driver for PCMCIA Applications," as retrieved from: https://www.maximintegrated.com/en/products/power/isolated-power/MAX845.html, Feb. 2017, pp. 1-16.

"12V or Adjustable, High-Efficiency, Low IQ, Step-Up DC-DC Controller," as retrieved from: https://www.maximintegrated.com/en/products/power/switching-regulators/MAX1771.html, Feb. 2017, pp. 1-16.

"LTC3706: Secondary-Side Synchronous Forward Controller with PolyPhase Capability," Linear Technology, 2005, pp. 1-22 as retrieved from: http://www.linear.com/product/LTC3706#notify.

"LTC3725: Single-Switch Forward Controller and Gate Driver," Linear Technology, 2005, pp. 1-20 as retrieved from: of http://www.linear.com/product/LTC3725.

"MAX630/MAX4193: CMOS Micropower Step-Up Switching Regulator," Maxim, 2008, pp. 1-14.

"LM3001 Primary-Side PWM Driver," 1995, National Semiconductor, 21 pages.

"LM3101Secondary-Side PWM Controller," 1995, National Semiconductor, pp. 1-20.

Final Office Action dated Jul. 23, 2019 for U.S. Appl. No. 15/202,746.

Vu, Tue T. et al. "Primary-side sending for a flyback converter in both continuous and discontinuous conduction mode," IET Irish Signals and Systems Conference (ISSC 2012) , Jun. 2012, pp. 1-6, IET, Maynooth, Ireland.

Power Integrations Design Example Report, "3 W Single Output, <10 mW No-load Consumption, Isolated Adapter Using LinkSwitch-XT", Applications Engineering Department, DER-227, Oct. 6, 2009, Revision 1.1, pp. 1-28, Retrieved from http://www.powerint.com/sites/default/files/PDFFiles/der227.pdf.

* cited by examiner

POWER CONVERTER WITH DEMAND PULSE ISOLATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application] *Notice: The following multiple reissue applications have been filed for the reissue of U.S. Pat. No. 9,071,152: (1) reissue application Ser. No. 15/090,929, filed on Apr. 5, 2016 and reissued as U.S. Reissue Pat. No. RE47,031; (2) reissue application Ser. No. 15/168,998 (the present application), filed on May 31, 2016, which is a reissue continuation of Ser. No. 15/090,929; and (3) reissue application Ser. No. 15/202,746, filed on Jul. 6, 2016, which is a reissue continuation of Ser. No. 15/090,929. U.S. Pat. No. 9,071,152* claims the benefit of the filing dates of U.S. provisional application Nos. 61/667,473, filed on Jul. 03, 2012, and 61/727,795, filed on Nov. 19, 2012, the teachings of both of which are incorporated herein by reference in their entirety.

BACKGROUND

1. Field of the Invention

The present invention relates to electronics and, more specifically but not exclusively, to switched-mode power converters.

2. Description of the Related Art

This section introduces aspects that may help facilitate a better understanding of the invention. Accordingly, the statements of this section are to be read in this light and are not to be understood as admissions about what is prior art or what is not prior art.

Switched-mode DC-DC power converters, often powered by rectified DC from AC mains, are ubiquitous as plug-in adapters used to power a plethora of electronic devices.

A typical such converter is copiously documented in the Power Integrations Design example report DER-227. Such converters are also taught in U.S. Pat. No. 4,459,651 and U.S. Patent Application Publication Nos. 2011/0026277 A1 and 2011/0018590 A1. Such converters typically generate commutation pulses on the mains side of galvanic isolation circuitry.

Some known converters use forms of absorption modulation to convey feedback information through the power transformer. In U.S. Pat. No. 8,000,115, a temporary decrease in the loading of a transformer secondary winding during a flyback pulse generates a corresponding voltage disruption of the same pulse, which disruption is detected on another transformer winding to effect primary-winding-side converter control. In U.S. Pat. No. 5,973,945, a similar method is taught, but instead of unloading a flyback pulse, temporary loading of a forward power pulse is taught. The circuitry for extracting the resulting information-bearing current disruption in the transformer primary circuit is quite involved. A similar absorption modulator is taught in U.S. Pat. No. 4,996,638.

Converters are also known wherein an analog voltage reflection of the converter output voltage seen on a primary-side winding is processed to generate a primary-side analog feedback signal which is used to control the commutating signals applied to the commutating switch to regulate converter output on its secondary side. Such feedback methods are taught in U.S. Pat. Nos. 4,597,036 and 3,889,173. Such methods are becoming less common due to the difficulty of reliably processing the analog information reflected into a primary-side winding to obtain an accurate feedback signal.

U.S. Pat. No. 4,937,727 teaches a mains-side pulse generator that is pulse-width controlled by a voltage-responsive clamp on the output side of a galvanic isolation barrier.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Figure 1:
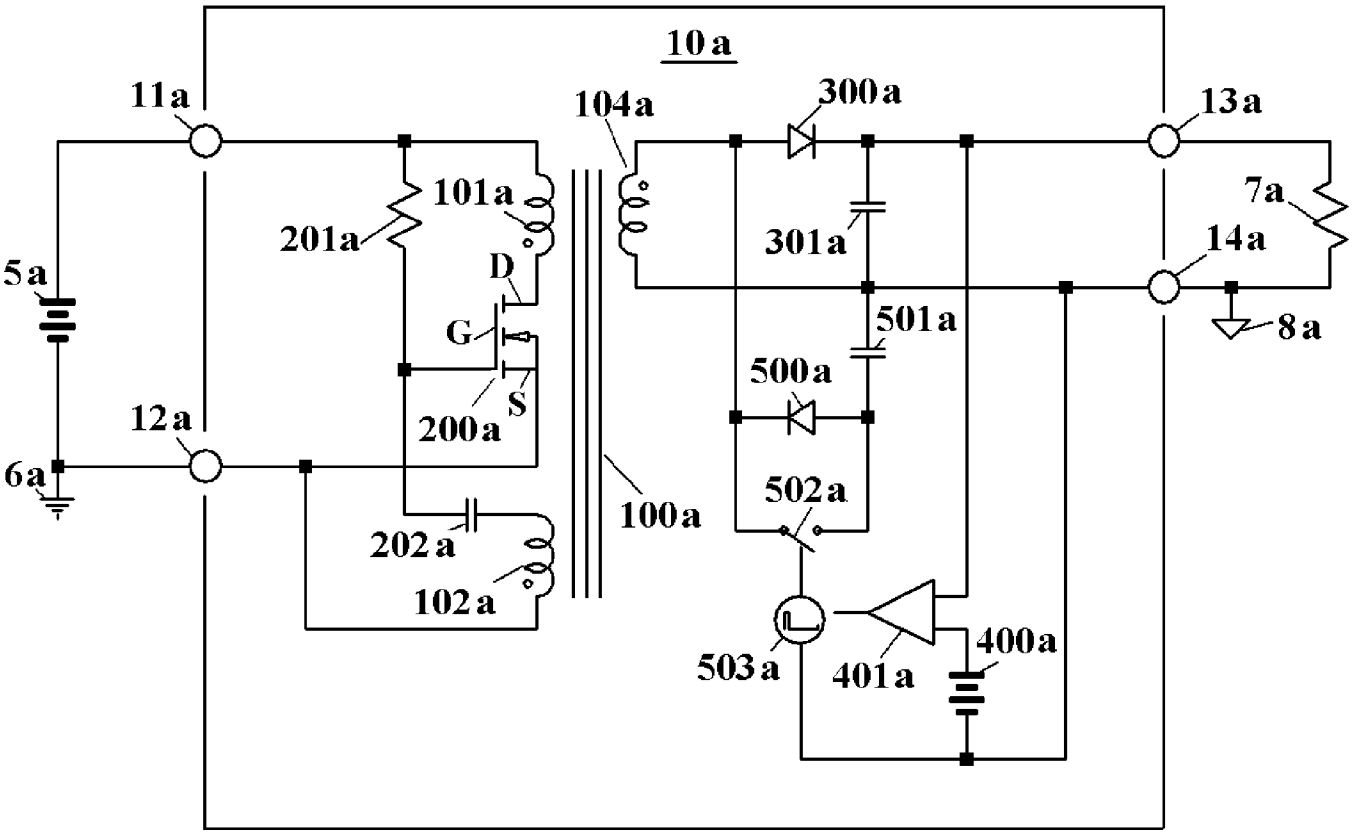
FIG. 1 shows a schematic diagram of a power converter according to an embodiment of the present invention using a blocking oscillator.

FIG. 1 shows a schematic diagram of a power converter 10a. A DC voltage source 5a, external to this converter, which may be derived from AC mains, may be connected to an earth ground 6a. Terminals 11a and 12a constitute a power input port that places source 5a in circuit with a primary winding 101a of a transformer 100a and with a commutating switch 200a, which is usually a MOSFET but may be a BJT or any other suitable electronic switch. For the diagrammed embodiment, switch 200a is a MOSFET having a source S, a gate G, and a drain D. Transformer 100a also comprises a regeneration winding 102a which is referenced to source S of MOSFET 200a, is connected through a capacitor 202a to gate G of MOSFET 200a, and is poled to provide regenerative feedback to gate G of MOSFET 200a. Connected between terminal 11a and gate G of MOSFET 200a is a resistor 201a which charges capacitor 202a to enhance MOSFET 200a at a slow pulse rate. Thus, MOSFET 200a, transformer 100a, capacitor 202a, and resistor 201a form an input-side blocking oscillator which acts as a driver circuit toggling ON and OFF MOSFET 200a.

Transformer 100a also comprises a secondary winding 104a which may be connected to a floating common terminal 14a. A diode 300a and a capacitor 301a form a rectifier circuit to rectify and filter voltage pulses from winding 104a to supply power through a power output port comprising terminals 13a and 14a to an external load represented by resistor 7a connected in circuit therewith, one end of which may be referred to a floating common 8a. The power input port 11a/12a and the power output port 13a/14a may be galvanically isolated from each other.

Flyback pulses of transformer 100a occur when MOSFET 200a ceases conduction, i.e., turns OFF. Winding 104a is poled to cause diode 300a to rectify only these flyback pulses.

Forward pulses, of opposite polarity to the flyback pulses, occur while MOSFET 200a is ON. Another diode 500a, poled to rectify forward pulses, and another capacitor 501a form an auxiliary rectifier circuit to rectify and filter forward pulses from winding 104a, and to store energy for triggering the input-side blocking oscillator formed by MOSFET 200a, transformer 100a, capacitor 202a, and resistor 201a. Resistor 201a is made sufficiently large to set a low free-running frequency of the blocking oscillator, perhaps 1 KHz or less, to minimize power consumption. Nevertheless, the miniscule power thus provided suffices to charge capacitor 501a to a voltage related, through the turns ratio of transformer 100a, to the voltage at the power input port, even with the power output port short-circuited.

This magnetically-coupled blocking oscillator may be triggered through any transformer winding magnetically coupled thereto. Therefore, just as MOSFET 200a may be turned ON through winding 102a, it may as easily be triggered through winding 104a. To trigger thusly, diode 500a is briefly short-circuited by a switch 502a which is driven by a demand pulse generator 503a to source a pulse of energy from capacitor 501a into transformer 100a. When this is done, the voltage at the cathode of diode 500a falls rapidly to the voltage on its anode, also being the voltage across capacitor 501a. Since winding 104a is coupled to winding 101a, the voltage on drain D of MOSFET 200a also rapidly falls from near the voltage on terminal 11a to near the voltage on terminal 12a. Since winding 102a is also magnetically coupled, the voltage at its node shared with capacitor 202a abruptly rises, turning ON MOSFET 200a. This triggering action occurs in a few tens of nanoseconds. Until regeneration is established in MOSFET 200a through winding 102a, triggering energy is supplied by capacitor 501a of the auxiliary rectifier circuit. However, once regeneration is established in MOSFET 200a, capacitor 501a is charged for the duration of the ON time of MOSFET 200a, fully replacing any energy lost during triggering. The demand pulse generator 503a may be used to adjust the commutation frequency of the converter 10a to cause its output to attain a desired value, as will be described below.

It is important to understand certain important advantages of this embodiment. Firstly, this embodiment allows minimal, simple, and robust circuitry to be galvanically associated with the power input port where high voltages and mains transients may be expected. According to this embodiment, more complex and vulnerable regulation circuitry may be galvanically associated with the power output port where voltages are often lower and protection is more easily implemented. Secondly, the control of a flyback converter that may cross from the discontinuous conduction mode (DCM), through the critical conduction mode, to the continuous conduction mode (CCM), is well known to be problematic. This embodiment simply avoids that problem. In the embodiment shown in FIG. 1, transformer 100a is used during the conduction of MOSFET 200a as a forward converter supplying the auxiliary rectifier circuit, and during the flyback of transformer 100a as a flyback converter supplying power to the power output port. During these cycle portions, it is difficult and impractical to re-trigger the blocking oscillator through transformer 100a to generate another energy-bearing cycle. Once the flyback pulse has reset the inductance of transformer 100a, i.e., has depleted energy from its magnetic field, transformer 100a is free, until the next ON time of MOSFET 200a, to be used as a magnetically coupled isolator to convey trigger information between its windings. In FIG. 1, the information thus conveyed is a pulse from pulse generator 503a which, responsive to the output of comparator 401a, indicates the need for another energy-bearing cycle, and moreover re-triggers the blocking oscillator to provide that energy-bearing cycle. Since it is difficult or impractical to re-trigger until transformer 100a energy has been depleted, this converter will, if driven as hard as possible, approach critical conduction, but refuse to enter the critical conduction mode.

This converter may be fitted with a reference voltage 400a and a comparison circuit 401a. When the voltage at terminal 13a falls below the comparison voltage, comparison circuit 401a causes pulse generator circuit 503a to pulse, turning ON switch 502a, triggering an energy-bearing ON cycle of the blocking oscillator, and charging capacitor 301a. As load 7a drains capacitor 301a, terminal 13a voltage repeatedly falls to the voltage of reference 400a, causing comparison circuit 401a to initiate energy-bearing ON cycles. An interesting property of this embodiment is that the bottom of its output ripple corresponds to the voltage of reference 400a, and the amplitude of its ripple decreases with increased current in load 7a.

Figure 2:
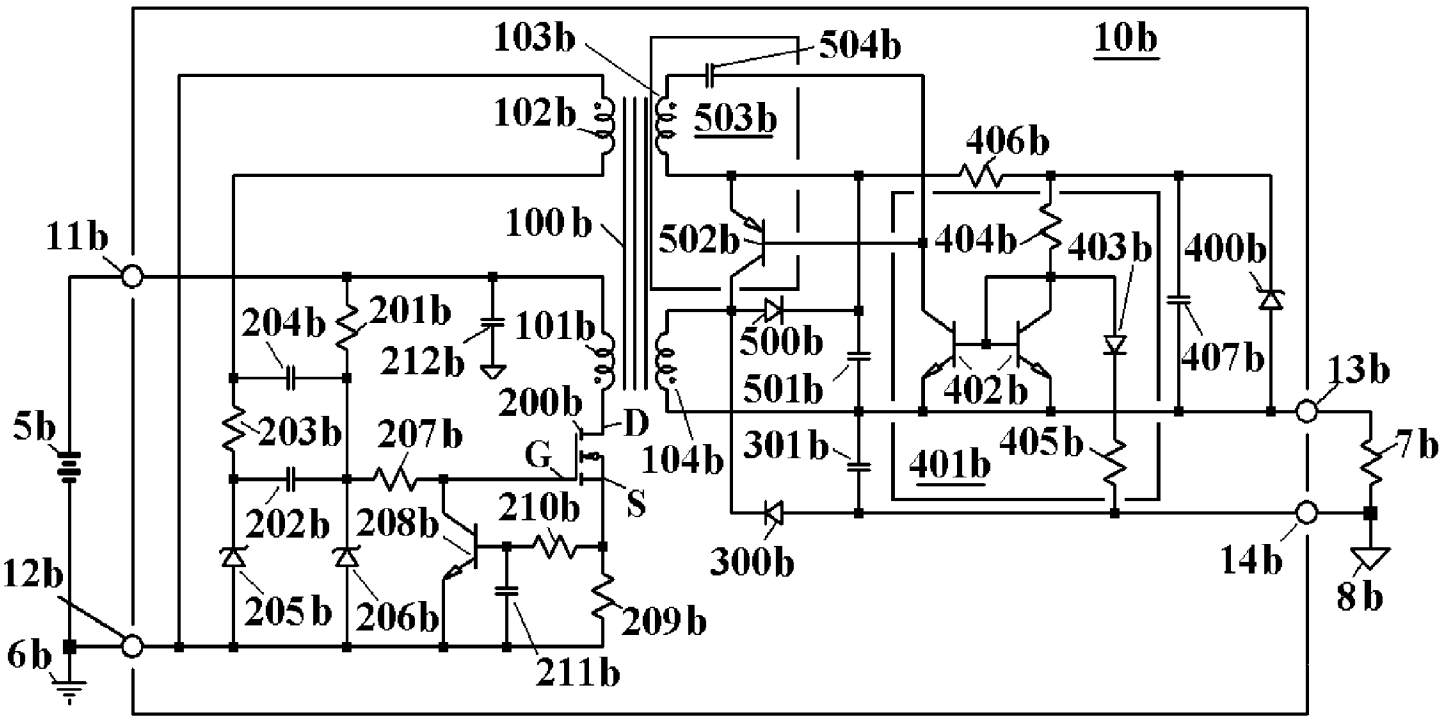
FIG. 2 shows a schematic diagram of a power converter according to another embodiment of the present invention using a blocking oscillator.

FIG. 2 shows a schematic diagram of a power converter 10b. As in converter 10a of FIG. 1 above, converter 10b is powered, through terminals 11b and 12b, from an external source 5b, that may be referred to earth ground 6b. Power from converter 10b flows through terminals 13b and 14b through a load 7b, which may be referred to a floating common 8b. A MOSFET 200b, preferably ON Semiconductor type NDD02N60, forms an input-side blocking oscillator with a (preferably 1 nF) capacitor 202b, a (preferably 66 megohm) resistor 201b, and a transformer 100b. Transformer 100b comprises a winding 101b, preferably about 250 uH, and windings 102b and 104b, preferably about 3.09 uH each, and a winding 103b, preferably about 193 nH, which may be a single turn. A capacitor 212b provides a short local circuit for high frequency currents and preferably comprises a 4.7 uF capacitor and a 100 nF capacitor (neither explicitly shown) in parallel. A resistor 210b, preferably about 180 ohms, and a capacitor 211b, preferably about 10 pF, filter out capacitive spikes generated by fast transitions of MOSFET 200b. When MOSFET 200b is turned on, the current therein rises, but is limited by a transistor 208b, the base of which is driven by a voltage across a resistor 209b, which voltage is responsive to current through MOSFET 200b. When MOSFET 200b current reaches about 250 mA, transistor 208b shunts current at gate G of MOSFET 200b to ground, limiting gate G voltage to prevent further current rise. With current rise prevented, the voltages across the windings of transformer 100b collapse. Thus, a regenerative turn-OFF of MOSFET 200b begins, and the voltage at its drain D flies positive past the voltage on terminal 11b until the energy in its magnetic field finds a current path through one of its windings. A corresponding negative voltage occurs at the shared node of winding 102b and a capacitor 204b, preferably about 100 pF, which immediately couples through a resistor 207b, preferably about 47 ohms, vigorously turning off MOSFET 200b. Within a few nanoseconds, the same transition couples through a resistor 203b, preferably about 1K, and a capacitor 202b, preferably about 1 nF, to join the signal passing through capacitor 204b, to reinforce the OFF transition at gate G of MOSFET 200b. Both the OFF and ON transitions at gate G of MOSFET 200b are regenerative and follow the path just described. To prevent damage to MOSFET 200b, its gate voltage should be limited. Resistor 203b and a diode 205b, preferably an 8.2 volt zener, form an L-network to limit that voltage. Since the voltage at the cathode of diode 205b is capacitively coupled to resistor 207b, and resistor 201b is pulling up on resistor 207b, the gate G voltage of MOSFET 200b would be free to rise, turn ON MOSFET 200b continually, and perhaps damage its gate, if means for limiting gate voltage were not provided. Another zener diode 206b, preferably the zenered base-emitter junction of an NXP type PMBT 3904, is used to limit the gate voltage rise. This device is used because, at high temperature, excess leakage of diode 205b would shunt to ground the current of resistor 201b, preventing the blocking oscillator from starting. Most of the current from winding 102b, being too great for diode 206b to conduct without damage, flows in diode 205b.

As in FIG. 1, when the voltage at the node of winding 104b and a diode 300b, preferably type 1N4148, flies back, the energy in transformer 100b is dumped into a capacitor 301b, preferably 4.7 uF, ultimately to be consumed by load 7b. As in FIG. 1, a diode 500b, preferably type 1N4148, and a capacitor 501b, preferably 220 nF, form a forward converter to supply an auxiliary voltage.

Please note that, in this embodiment, the poling of winding 104b, diode 300b, and diode 500b are reversed, and the output polarity is reversed, with respect to FIG. 1. This reversal illustrates that this embodiment will function with either poling, and that polarity is of little practical concern in an isolated supply. The rectifiers and windings are so poled that the auxiliary supply forms a forward converter, and the output forms a flyback converter with the remaining circuitry. A switch 502b is, in this embodiment, a PNP transistor, preferably type MMBT 3906. This switch also coacts with another winding 103b of transformer 100b, which may be a single turn, and a capacitor 504b, to form an output-side triggering blocking oscillator 503b corresponding to pulse generator 503a of FIG. 1, which triggering blocking oscillator is magnetically coupled through transformer 100b to the above-described input-side, power-blocking oscillator comprising MOSFET 200b. Thus, an input-side, master blocking oscillator comprising MOSFET 200b and an output-side, slave blocking oscillator comprising switch 502b are magnetically coupled to each other through transformer 100b. The auxiliary voltage of capacitor 501b flows through a resistor 406b, preferably 27K, to feed another zener diode 400b, preferably another zenered PMBT3904, corresponding to reference 400a of FIG. 1. A capacitor 407b, preferably 100 nF, bypasses diode 400b at high frequencies. A dual transistor 402b, preferably NXP type BS846, is connected as a current mirror, and mirrors the current in a resistor 404b, the latter current being set by the reference voltage of diode 400b. This current sets the free running oscillation frequency of blocking oscillator/pulse generator 503b. Since the transformer 100b current flowing in MOSFET 200b is set by transistor 208b, the per-cycle energy in transformer 100b is quantized. Setting the current in resistor 404b, preferably 100K, therefore sets a maximum frequency of blocking oscillator/demand-pulse generator 503b, thereby setting the maximum frequency for these energy-quantized cycles, thus limiting maximum converter power, even in the event of an output short-circuit. A diode 403b, preferably type 1N4148, compensates the base-emitter voltage of dual-transistor 402b. Dual transistor 402b, resistor 404b, diode 403b, and a resistor 405b form a current comparator corresponding to comparator 401a of FIG. 1. Resistor 405b, preferably about 82K for a 5V output, provides feedback by robbing resistor 404b current from the current mirror of dual-transistor 402b as output voltage increases, thus setting operating frequency roughly in proportion to the demand of load 7b.

Figure 3:
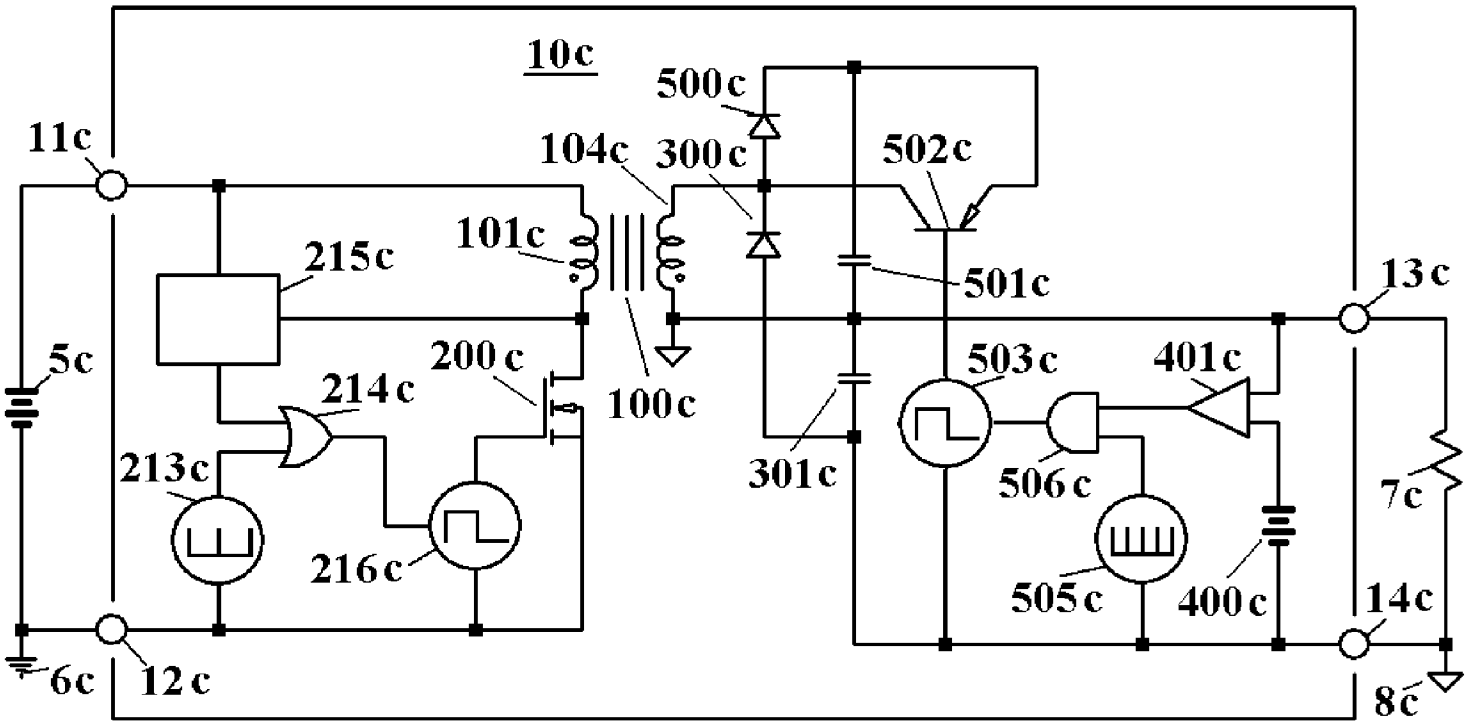
FIG. 3 shows a schematic diagram of a power converter according to an embodiment of the present invention using a simple transformer.

FIG. 3 shows a schematic diagram of a power converter 10c arranged to use a simple, two-winding transformer. The function of converter 10c closely parallels that of converters 10a and 10b of FIGS. 1 and 2, save that components have been added to replace the functions of regenerative (tickler) windings needed by blocking oscillators. As in the previous figures, a source 5c may be referenced to an earth ground 6c, and load 7c may be referenced to a floating common 8c. As in FIG. 1, a transformer 100c primary winding 101c is in circuit with a switch 200c and terminals 11c and 12c. As in FIG. 1, flyback pulses on a secondary winding 104c of transformer 100c charge a capacitor 301c through a diode 300c to supply energy to the load 7c through terminals 13c and 14c. As in FIG. 1, forward pulses on the secondary winding of transformer 100c charge a capacitor 501c through a diode 500c. As in FIG. 1, a comparison circuit 401c compares the voltage on the output terminal 13c with a reference 400c. As in FIG. 1, a switch 502c is driven by a demand pulse generator 503c.

We now depart from the FIGS. 1 and 2 function. A fast oscillator 505c, preferably about 100 KHz, drives an AND gate 506c which is also driven by comparison circuit 401c. If the voltage between terminals 13c and 14c is smaller than that of reference 400c, gate 506c passes oscillator 505c pulses to trigger pulse generator 503c, which initiates, through transformer 100c additional energy-bearing pulses by eventually driving switch 200c, as described below. If, however, the output voltage is adequate, then gate 506c does not pass oscillator 505c pulses.

The pulses of energy from capacitor 501c sourced to transformer 100c, [though] *through* a switch 502c, during the pulse of generator 503c, under the command of gate 506c, appear as voltage pulses across the primary winding of transformer 100c. These pulses are detected and processed to logic levels by a demand pulse detector 215c and passed through an OR gate 214c to a pulse generator that turns ON switch 200c to energize transformer 100c to begin an energy-bearing cycle. When switch 200c turns OFF, the subsequent flyback pulse charges capacitor 301c through diode 300c, as previously described. Since capacitor 501c is charged from the converter forward pulse, its voltage persists even in the presence of a short-circuit load, allowing the converter to recover once the short-circuit is removed.

Had no energy-bearing cycle ever occurred, there might be insufficient, or no, charge in capacitor 501c to be used to initiate energy-bearing cycles as described above. Therefore, a slow pulse oscillator 213c, preferably about 1 KHz, is also connected to gate 214c, through which it initiates energy-bearing cycles by triggering a pulse generator 216c, thus turning on switch 200c. These infrequent pulses cause energy-bearing cycles that are sufficient to charge capacitor 501c, which also may supply power to generator 503c, gate 506c, oscillator 505c, reference 400c, and comparison circuit 401c. Of course, slow oscillator 213c must somehow be powered along with gate 214c and pulse generator 216c. A bias supply (not shown but well known in the art) powered from terminals 11c and 12c, may be used to power these components of the circuit.

Figure 4:
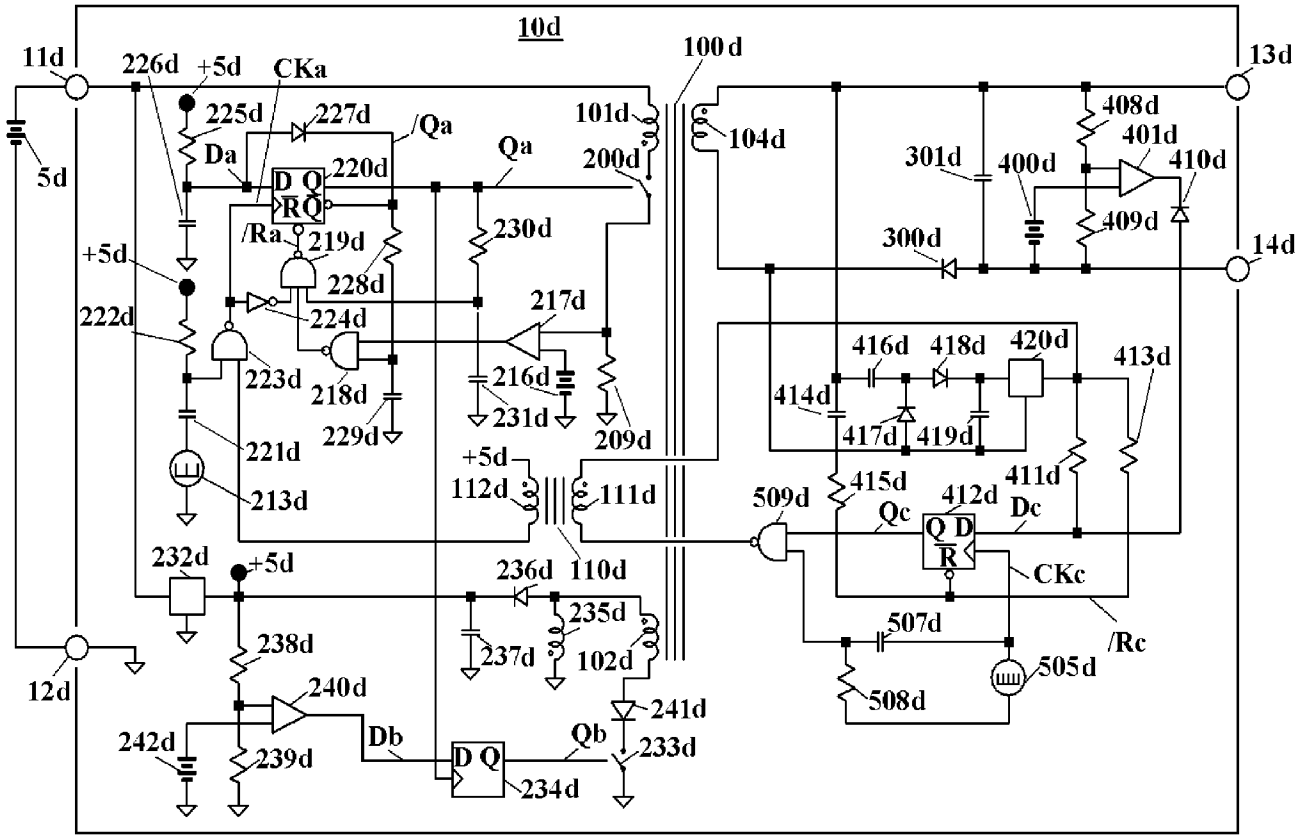
FIG. 4 shows a schematic diagram of a power converter according to an embodiment of the present invention using a separate pulse transformer.

FIG. 4 shows a schematic diagram of a power converter 10d, comprising a separate transformer 110d to transmit demand pulses across a galvanic isolation barrier. As in FIG. 1 above, converter 10d is powered, through terminals 11d and 12d, from an external source 5d, and power output from converter 10d flows through terminals 13d and 14d.

Input voltage from terminals 11d and 12d powers a slow oscillator 213d, preferably of less than 1 KHz frequency, and a start-up regulator 232d which, through a supply node +5d, initially powers, with a voltage preferably about 4V, logic and drive circuitry described below. Each label "+5d" in FIG. 4 refers to a supply node that is initially about 4 volts when the input-side logic is starting to function and about 5 volts when in regulation. A capacitor 221d and a resistor 222d differentiate transitions of a slow pulse oscillator 213d to provide pulses of about 200 nS duration. These pulses pass [though] *through* a NAND gate 223d to clock a D-type flip-flop 220d through a node CKa.

Responsive to its clock pulse, flip-flop 220d turns ON a switch 200d, preferably a MOSFET, ON Semiconductor type NDD02N60, which is in circuit with a primary winding 101d of a transformer 100d, with a sense resistor 209d, and with terminals 11d and 12d. Current then flows in this circuit, and the voltage of source 5d is impressed upon primary winding 101d. According to the turns-ratio between primary winding 101d and a secondary winding 104d of transformer 100d, a voltage appears across winding 104d. This latter voltage charges a capacitor 416d through a diode 417d.

As current in resistor 209d rises, a voltage is applied to an input of a comparator 217d, which voltage is compared with a reference 216d, also connected to an input of comparator 217d. When current in resistor 209d exceeds a value set by reference 216d, comparator 217d issues a reset signal which propagates through NAND gates 218d and 219d to a node/Ra where the reset signal resets flip-flop 220d, turning OFF switch 200d.

When switch 200d is turned ON, unavoidable gate-to-source capacitance of MOSFET switch 200d causes a current spike in resistor 209d. To prevent comparator 217d from prematurely resetting flip-flop 220d responsive to this spike, the rise of node Qa charges a capacitor 231d through a resistor 230d to reach the threshold of a gate 219d in about 75 nS, prior to which the low voltage of capacitor 231d inhibits gate 219d from resetting flip-flop 220d.

Prior to its rise, node Qa has been low, and a complementary node/Qa has been high. When node Qa rises, node/Qa falls, discharging a capacitor 229d through a resistor 228d to the threshold of NAND gate 218d in about 2 uS, and [though] *through* NAND gate 219d resetting flip-flop 220d, thus limiting the maximum ON time of switch 200d, should comparator 217d fail to reset flip-flop 220d.

In addition to limiting ON times of switch 200d, it is desirable to limit maximum frequency of these ON times. To this end, the voltage across a capacitor 226d is charged to a logic high through a resistor 225d and applied to a node Da, the D-input of flip-flop 220d. When node/Qa falls, capacitor 226d is discharged through a diode 227d, slowly to be recharged through resistor 225d. Until the capacitor 226d voltage is recharged to the D-input threshold voltage, flip-flop 220d is inhibited from turning ON switch 200d.

When switch 200d is turned OFF, the energy in the magnetic field of transformer 100d generates flyback voltage across its windings. Flyback voltage of winding 104d is rectified by a diode 300d and begins to charge a filter capacitor 301d to begin to supply output voltage to terminals 13d and 14d. This flyback voltage also raises the voltage on capacitor 416d, causing diode 417d to turn OFF and a diode 418d to turn ON, charging a capacitor 419d. Voltage across capacitor 419d supplies an auxiliary regulator 420d, which in turn powers a fast oscillator 505d, preferably of about 60 KHz frequency. Regulator 420d also powers logic and drive circuitry on the winding 104d side of the power converter.

The ON pulses of switch 200d responsive to oscillator 213d are sufficiently frequent to start the converter of this embodiment, but insufficiently frequent to drive it to full output. To initiate more frequent pulses, an oscillator 505d drives a capacitor 507d and a resistor 508d to supply differentiated pulses of about 100 nS width to a NAND gate 509d, which in turn drives a primary winding 111d of demand pulse transformer 110d, thus producing demand pulses across a secondary winding 112d thereof. These winding 112d pulses are conveyed through a NAND gate 223d to clock flip-flop 220d at up to the frequency of oscillator 505d.

If all of the pulses of oscillator 505d were allowed to clock flip-flop 220d, under some conditions, the converter of this embodiment would produce excess output. To regulate this output, a flip-flop 412d is used to gate the pulses passed by NAND gate 509d. At a node CKc, oscillator 505d clocks a flip-flop 412d, which generates a logic high at a node Qc only when a logic high is present at a node Dc at the rising edge of its clock. Thus, pulses driving transformer 110d are permitted responsive to a logic high only at node Dc.

It would be wasteful of power to drive winding 111d for the full duration of the differentiated pulse at resistor 508d. Therefore, when switch 200d turns ON causing a negative transition at the dotted end of winding 101d, a corresponding negative transition appears at the dotted end of winding 104d. This transition is coupled through a small capacitor 414d, preferably about 10 pF, through a current-limiting resistor 415d to a node/Rc, the reset input of flip-flop 412d, which is normally held high by a resistor 413d. Thus, once the turning ON of switch 200d has propagated through transformer 100d, flip-flop 412d is reset, usually in less than 20 nS.

Node Dc is usually held at a logic high by a resistor 411d, thus enabling pulses gated by flip-flop 412d. However, between terminals 13d and 14d is disposed a voltage divider comprising resistors 408d and 409d, the voltage at the junction of which is applied to an input of a comparator 401d. Should the voltage at that junction exceed the voltage of a reference 400d, also applied to a comparator 401d input, an output of comparator 401d will drop to a logic low, drawing current through a diode 410d, thus presenting a logic low at node Dc and, after clocking, responsively at node Qc, inhibiting pulses through gate 509d that would otherwise turn ON switch 200d. Thus, the voltage between terminals 13d and 14d is regulated responsive to the voltage of reference 400d.

Since the voltage between terminals 11d and 12d may be high, perhaps 375V, and the desired regulated voltage at node +5d is typically 5V, it might be inefficient to obtain the power to supply the logic and drive circuitry associated with winding 101d from regulator 232d. Therefore, transformer 100d is fitted with an auxiliary winding 102d, which is connected in circuit with an inductor 235d, a diode 241d, and a switch 233d, preferably a MOSFET. While switch 200d is ON, current flows in this circuit. When switch 200d turns OFF, diode 241d also turns OFF and energy in inductor 235d generates a positive flyback voltage, causing current through a diode 236d to charge a filter capacitor 237d, raising the voltage of node +5d. As node +5d approaches 5V, regulator 232d ceases to supply energy to node +5d, but continues to power a voltage reference 242d, which drives an input of a comparator 240d. Should the voltage of node +5d exceed 5V, the voltage at the junction of resistors 238d and 239d, connected to another input of comparator 240d, will exceed that of reference 242d, causing the output of comparator 240d at node Db to drop to a logic low.

A flip-flop 234d drives node Qb to turn ON switch 233d responsive to clock pulses on node Qa, and to a logic high being present at node Db. When node Db drops to a logic low, node Qb follows it upon the next clock, and switch 233d turns OFF. In this state, inductor 235d no longer receives energy and no longer charges capacitor 237d through diode 236d. Thus, node +5d is regulated to approximately 5V, and the energy supplying node +5d is provided efficiently through transformer 100d.

In one embodiment, the invention is a switched-mode power-converter comprising a power input port, a transformer comprising windings, a commutating switch connected in circuit with the input port and a winding of the transformer, a driver circuit for toggling the commutating switch, a power output port, a rectifier circuit for supplying power to the power output port, a reference voltage or current source, a comparison circuit for comparing the voltage or current at the power output port with the reference voltage or current, and a demand pulse source circuit coupled to the transformer for transmitting galvanically isolated trigger information through the transformer to the driver circuit responsive to the comparison circuit.

The converter may comprise as its driver circuit a blocking oscillator comprising the converter transformer. The converter may further comprise an input-side, master blocking oscillator for power conversion and an output-side, slave blocking oscillator for generating demand pulses. Both blocking oscillators may be mutually coupled through the converter power transformer or may drive separate transformers.

The converter may comprise inductive, capacitive, optocoupled, or piezoelectric galvanic isolation circuitry to transmit demand pulses across the galvanic isolation barrier.

The converter may have one or more output rectifier circuits poled to rectify flyback pulses of its transformer.

The converter may comprise one or more auxiliary rectifier circuits which may be poled as forward converters.

The converter may be powered by a rectifier circuit to provide an AC/DC converter.

It should be understood that replicas of pulses generated and applied to one winding of the power transformer appear, suitably modified by turns-ratio, across all other windings of the power transformer.

Though blocking oscillators usually require tickler windings, single output embodiments of this invention may comprise a power transformer with as few as two, and in excess of five windings, with multiple output embodiments possibly comprising yet more windings.

Startup pulse generation circuitry resides on the powered side of the isolation barrier, though its pulses appear on both sides of the isolation barrier. This circuitry may comprise a blocking oscillator, another form of oscillator with drive circuitry to turn ON the commutating switch, or this circuitry may comprise an external source of pulses.

Demand pulse generator circuitry resides with the output port to be regulated, though its pulses appear on both sides of the isolation barrier. This circuitry may comprise a slave blocking oscillator, another form of oscillator with drive circuitry to turn ON the demand pulse generator switch, or may be externally applied.

Demand pulses may be generated to regulate the power converter to provide either a desired output voltage or a desired output current responsive to the voltage across or a current through an output port.

Between the commencement of start-up and the attainment of regulation, a pulse generator sources pulses to turn ON the commutating switch. This pulse generator may be the same generator that sources regulation pulses, or may be a separate pulse generator.

Each internal pulse generator is powered. The startup pulse generator is powered from the input port. The demand pulse generator is only indirectly powered from the input port by DC-DC power conversion through the power transformer and one or more rectifiers and filters powering the power output port with which the generator is associated.

Power for pulse generation circuitry may be rectified from either forward pulses, from flyback pulses, or both, appearing across one or more power transformer windings. Rectification of forward pulses helps to assure startup.

Windings, switches, and diodes may be poled to provide either polarity of input, and either polarity of output.

In each of the embodiments of FIGS. 1-4, galvanic isolation circuitry transfers (i) power from the input-port side to the output-port side of the power converter and (ii) demand pulses from the output-port side to the input-port side. In particular, in FIG. 1, the galvanic isolation circuitry consists of transformer 100a, which transfers (i) power from winding 101a to winding 104a and (ii) demand pulses from winding 104a to winding 102a. In FIG. 2, the galvanic isolation circuitry consists of transformer 100b, which transfers (i) power from winding 101b to winding 104b and (ii) demand pulses from winding 104b to winding 102b. In FIG. 3, the galvanic isolation circuitry consists of transformer 100c, which transfers (i) power from winding 101c to winding 104c and (ii) demand pulses from winding 104c to winding 101c. In FIG. 4, the galvanic isolation circuitry consists of (i) transformer 100d, which transfers power from winding 101d to winding 104d and (ii) transformer 110d, which transfers demand pulses from winding 111d to winding 112d. Winding 102d generates the bias supply for powering the +5d node.

In each of the embodiments of FIGS. 1-4, a demand pulse generator on the output-port side of the converter generates the demand pulses that are conveyed to the input-port side of the converter via the galvanic isolation circuitry. In FIGS. 1, 2, and 3, the demand pulse generator comprises elements 503a, 503b, and 503c, respectively. In FIG. 4, the demand pulse generator comprises NAND Gate 509d and flip-flop 412d.

In each of the embodiments of FIGS. 1-4, slow-pulse source circuitry generates pulses on the input side of the power converter. In FIGS. 1 and 2, the slow-pulse source circuitry is the corresponding input-side blocking oscillator. In FIGS. 3 and 4, the slow-pulse source circuitry is slow oscillator 213c and slow oscillator 213d, respectively. Note that, depending on the particular implementation, the slow-pulse source circuitry may be implemented internal to or external to the switched-mode power converter. Similarly, depending on the particular implementation, fast oscillator 505c and fast oscillator 505d of FIGS. 3 and 4, respectively, may be implemented internal to or external to the switched-mode power converter.

Embodiments of the invention may be implemented as (analog, digital, or a hybrid of both analog and digital) circuit-based processes, including possible implementation as one or more integrated circuits (such as an ASIC or an FPGA), a multichip module, a single card, or a multicard circuit pack.

Also for purposes of this description, the terms "couple," "coupling," "coupled," "connect," "connecting," or "connected" refer to any manner known in the art or later developed in which energy or signals are allowed to be transferred between two or more elements, and the interposition of one or more additional elements is contemplated, although not required. Conversely, the terms "directly coupled," "directly connected," etc., imply the absence of such additional elements.

Also, for purposes of this disclosure, it is understood that all gates are powered from a fixed voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

Signals and corresponding nodes or ports may be referred to by the same name and are interchangeable for purposes here.

Transistors are typically shown as single devices for illustrative purposes. However, it is understood by those with skill in the art that transistors will have various sizes (e.g., gate width and length) and characteristics (e.g., threshold voltage, gain, etc.) and may consist of multiple transistors coupled in parallel to get desired electrical characteristics from the combination. Further, the illustrated transistors may be composite transistors.

The terms "source," "drain," and "gate" should be understood to refer either to the source, drain, and gate of a MOSFET or to the emitter, collector, and base of a bipolar device when an embodiment of the invention is implemented using bi-polar transistor technology. p Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to nonstatutory subject matter are explicitly disclaimed even if they fall within the scope of the claims.

What is claimed is:

[1. Apparatus configured to provide switched-mode power conversion, the apparatus comprising:

an input port configured to receive input power;

a switch configured to commutate the input power;

galvanic isolation circuitry configured to provide galvanic isolation between the input port and an output port, wherein the galvanic isolation circuitry comprises a transformer comprising (i) a primary winding arranged in circuit with the input port and the switch and (ii) a secondary winding arranged in circuit with a rectifier and the output port, wherein the transformer is configured to transfer power from the input port to supply voltage or current to a load connected to the output port; and a demand pulse generator galvanically connected to the secondary winding and configured to generate demand pulses applied via the galvanic isolation circuitry to the switch to adjust a frequency of the commutation of the input power to supply a desired amount of voltage or current to the load.]

[2. The apparatus of claim 1, further comprising:

a source configured to provide a reference signal; and comparison circuitry configured to compare the output port voltage or current to the reference signal wherein frequency of the demand pulses is responsive to the comparison between the output port voltage or current and the reference signal.]

[3. The apparatus of claim 1, further comprising input-side blocking oscillator circuitry configured to drive the switch.]

[4. The apparatus of claim 3, wherein the demand pulse generator comprises output-side blocking oscillator circuitry configured to generate the demand pulses.]

[5. The apparatus of claim 1, further comprising:

a fast oscillator configured to initiate the generation of the demand pulses; and logic circuitry configured to provide gating of the demand pulses applied to the galvanic isolation circuitry.]

[6. The apparatus of claim 1, wherein the galvanic isolation circuitry further comprises dedicated circuitry configured to convey the demand pulses across the galvanic isolation.]

[7. The apparatus of claim 1, wherein the demand pulses are conveyed from the demand pulse generator to the switch via the transformer.]

[8. The apparatus of claim 1, wherein:

the galvanic isolation circuitry divides the apparatus into (i) an input side corresponding to the primary winding of the transformer and (ii) an output side corresponding to the secondary winding of the transformer; and the demand pulse generator is located on the output side of the apparatus.]

[9. The apparatus of claim 1, further comprising a capacitor and a diode both galvanically connected to the secondary winding, wherein:

the diode is different from the rectifier and is poled to charge the capacitor during forward pulses of the apparatus; and the demand pulse generator is powered by energy stored in the capacitor to generate the demand pulses.]

[10. Apparatus configured to provide galvanically isolated switched-mode power conversion, the apparatus comprising:

an input port configured to receive input power;

a switch configured to commutate the input power;

a transformer comprising (i) a primary winding arranged in circuit with the input port and the switch and (ii) a secondary winding arranged in circuit with a rectifier and an output port, wherein the transformer is configured to supply power from the input port to a load connected to the output port; and a first pulse source circuitry located on an input side of the apparatus and configured to generate pulses to control the switch to start the power conversion; and a second pulse source circuitry located on an output side of the apparatus and configured to generate pulses to control the switch to continue the power conversion after being started by the first pulse source circuitry.]

[11. The apparatus of claim 10, wherein the frequency of pulses generated by the second pulse source circuitry is different from the frequency of pulses generated by the first pulse source circuitry.]

[12. The apparatus of claim 11, wherein the frequency of pulses generated by the second pulse source circuitry is greater than the frequency of pulses generated by the first pulse source circuitry.]

[13. The apparatus of claim 10, wherein the frequency of pulses generated by the first pulse source circuitry is about 1 KHz or smaller.]

[14. The apparatus of claim 13, wherein the frequency of pulses generated by the second pulse source circuitry is about 60 KHz or greater.]

[15. The apparatus of claim 10, further comprising a capacitor and a diode both galvanically connected to the secondary winding, wherein:

the diode is different from the rectifier and is poled to charge the capacitor during forward pulses of the apparatus; and the second pulse source circuitry is powered by energy stored in the capacitor to generate the pulses.]

[16. In an isolated switched-mode power converter having an input port and an output port, a method of regulation comprising:

(a) comparing a voltage or current at the output port with a reference that is galvanically associated therewith;

(b) generating or gating demand pulses responsive to that comparison;

(c) applying the demand pulses to an output-port side of galvanic isolation circuitry;

(d) receiving replicas of the demand pulses from an input-port side of the galvanic isolation circuitry; and (e) adjusting commutation frequency of the converter responsive to the demand pulses to cause the voltage or current at the output port to attain a desired value.]

[17. The method of claim 16, wherein step (b) comprises:

(b1) using a diode to charge a capacitor during forward pulses of the power converter, wherein the diode and the capacitor are galvanically connected within the output-port side of the galvanic isolation circuitry; and (b2) generating or gating the demand pulses using energy stored in the capacitor.]

*18. An article of manufacture comprising a flyback converter, the flyback converter comprising:*

*a primary side comprising an input port;*

*a secondary side comprising an output port, wherein the secondary side is galvanically isolated from the primary side; and*

*a power transformer configured to transfer input power received at the input port to provide output power at the output port, wherein:*

*the primary side further comprises a primary-side switch configured to selectively enable the input power at the input port to be transferred via the power transformer to the output power at the output port;*

*the secondary side further comprises a demand pulse generator that (i) determines when to turn on the primary-side switch based on output voltage or output current at the output port and (ii) generates corresponding demand pulses;*

*the primary side comprises a primary-side magnetically coupled conductor;*

*the secondary side comprises a secondary-side magnetically coupled conductor configured to be magnetically coupled to the primary-side magnetically coupled conductor to convey the demand pulses from the secondary side to the primary side;*

*the primary-side switch is turned on in response to the demand pulses conveyed from the secondary side to the primary side, wherein the determination of when to turn off the primary-side switch is originated on the primary side and not on the secondary side;*

*frequency with which the primary-side switch is turned on is adjusted by the demand pulses conveyed from the secondary side to the primary side to regulate the output voltage or the output current at the output port; and*

*the secondary side further comprises:*

*a first capacitor; and*

*a first rectifier poled to charge the first capacitor during forward power converter pulses of the flyback converter, wherein the demand pulses are generated using energy stored in the first capacitor.*

*19. The article of claim 18, wherein the secondary side further comprises a second capacitor, different from the first capacitor, and a second rectifier, different from the first rectifier, wherein flyback voltage of the power transformer is rectified by the second rectifier and charges the second capacitor to supply output voltage or current to the output port.*

*20. The article of claim 18, wherein the secondary side is configured to charge the first capacitor during flyback pulses of the flyback converter.*

*21. The article of claim 18, wherein the secondary side is configured to charge the first capacitor during forward power converter pulses of the flyback converter even if the output port is short-circuited.*

*22. The article of claim 18, wherein the demand pulse generator is configured to generate a demand pulse when a feedback signal based on the output voltage or the output current is lower in magnitude than a magnitude of a reference signal such that the demand pulses regulate the output port by driving the feedback signal to match the reference signal.*

*23. The article of claim 22, wherein the flyback converter regulates the output port to have the feedback signal match the reference signal.*

*24. The article of claim 18, wherein feedback from the secondary side to the primary side for regulating the output voltage or the output current is provided solely by the demand pulses generated by the demand pulse generator.*

*25. The article of claim 18, wherein:*

*each demand pulse conveyed from the secondary side to the primary side has a leading edge; and*

*when a particular demand pulse results in a particular occurrence of the primary-side switch turning on, the particular occurrence of the primary-side switch turning on is in response to detecting the leading edge of the particular demand pulse independent of any other demand pulses conveyed from the secondary side to the primary side and independent of any other pulse edges appearing on the primary side.*

*26. The article of claim 18, wherein the demand pulse generator comprises:*

*an oscillator that generates oscillator pulses, each oscillator pulse representing logic 1; and*

*logic circuitry that selectively blocks certain oscillator pulses in generating the demand pulses applied to the secondary-side magnetically coupled conductor.*

*27. The article of claim 26, wherein the logic circuitry is not an OR gate.*

*28. The article of claim 18, wherein the demand pulse generator comprises:*

*an oscillator that generates oscillator pulses, each oscillator pulse representing logic 1; and*

*logic circuitry that selectively blocks certain oscillator pulses from becoming demand pulses that would otherwise result in the primary-side switch being turned on, while selectively allowing other oscillator pulses to become the demand pulses that do result in the primary-side switch being turned on.*

*29. The article of claim 18, wherein frequency of the demand pulses generated by the demand pulse generator is greater than frequency of pulses initiated on the primary side that turn on the primary-side switch.*

*30. The article of claim 18, wherein the demand pulse generator generates a demand pulse whenever a magnitude of the output voltage or the output current is below a magnitude of the output port's regulation voltage or regulation current.*

*31. The article of claim 18, wherein the demand pulse generator processes a secondary-side stream of pulses based on a comparator output to generate the demand pulses.*

*32. The article of claim 18, wherein the demand pulse generator comprises:*

*a comparator configured to generate a comparator output based on a comparison between (i) a feedback signal based on the output voltage or the output current and (ii) a reference signal;*

*an oscillator configured to generate a stream of pulses independent of the comparator output; and*

*logic circuitry configured to (i) receive the comparator output and the stream of pulses and (ii) process the stream of pulses based on the comparator output to generate the demand pulses.*

*33. The article of claim 18, wherein regulation of the output port is based solely on the demand pulses generated on the secondary side.*

*34. The article of claim 18, wherein the determination of when to turn off the primary-side switch is always originated on the primary side and never on the secondary side.*

*35. The article of claim 18, wherein the power transformer is configured to transfer unipolar input power received at the input port to provide the output power at the output port.*

*36. The article of claim 18, wherein, unless the primary-side switch is already on due to a pulse generated on the primary side, the primary-side switch is turned on once for each different demand pulse.*

*37. The article of claim 18, wherein:*

*the power transformer has a primary-side winding and a secondary-side winding;*

*the primary-side switch is connected in series with the primary-side winding of the power transformer;*

*the secondary-side winding of the power transformer is connected to the output port;*

*the primary-side magnetically coupled conductor is different from the primary-side winding of the power transformer; and*

*the secondary-side magnetically coupled conductor is the secondary-side winding of the power transformer.*

*38. The article of claim 18, wherein:*

*the power transformer has a primary-side winding and a secondary-side winding;*

*the primary-side switch is connected in series with the primary-side winding of the power transformer;*

*the secondary-side winding of the power transformer is connected to the output port;*

*the primary-side magnetically coupled conductor is different from the primary-side winding of the power transformer; and*

*the secondary-side magnetically coupled conductor is different from the secondary-side winding of the power transformer.*

*39. The article of claim 18, wherein:*

*the power transformer has a primary-side winding and a secondary-side winding;*

*the primary-side switch is connected in series with the primary-side winding of the power transformer;*

*the secondary-side winding of the power transformer is connected to the output port;*

*the primary-side magnetically coupled conductor is the primary-side winding of the power transformer; and*

*the secondary-side magnetically coupled conductor is the secondary-side winding of the power transformer.*

*40. The article of claim 18, wherein:*

*the primary side comprises a primary-side oscillator configured to generate one or more primary-side pulses; and*

*the primary-side switch is configured to be turned on based on (i) the one or more primary-side pulses generated by the primary-side oscillator or (ii) the demand pulses received from the secondary side.*

*41. The article of claim 18, wherein the primary-side switch is turned on for a duration that is independent of duration of the demand pulse that caused the primary-side switch to be turned on.*

*42. The article of claim 18, wherein the primary side is configured to turn on the primary-side switch at power up, in order to transfer input power to the secondary side via the power transformer to power the demand pulse generator to generate the demand pulses.*

*43. The article of claim 18, wherein the secondary side does not generate pulses instructing the primary side to turn off the primary-side switch.*

*44. The article of claim 18, wherein the primary side is configured to avoid premature turnoff of the primary-side switch due to capacitive charging of the primary-side switch.*

*45. The article of claim 18, wherein the primary side is configured to establish a maximum duration for which the primary-side switch is allowed to stay on.*

*46. The article of claim 18, wherein the primary side further comprises a bias winding configured to assist in powering the primary side.*

*47. The article of claim 18, wherein the article further comprises a load connected to the output port and configured to be powered by the flyback converter.*

*48. A flyback converter comprising:*

*a primary side comprising an input port;*

*a secondary side comprising an output port, wherein the secondary side is galvanically isolated from the primary side; and*

*a power transformer configured to transfer input power received at the input port to provide output power at the output port, wherein:*

*the primary side further comprises a primary-side switch configured to selectively enable the input power at the input port to be transferred via the power transformer to the output power at the output port;*

*the secondary side further comprises a demand pulse generator that (i) determines when to turn on the primary-side switch based on output voltage or output current at the output port and (ii) generates corresponding demand pulses;*

*the primary side comprises a primary-side magnetically coupled conductor;*

*the secondary side comprises a secondary-side magnetically coupled conductor configured to be magnetically coupled to the primary-side magnetically coupled conductor to convey the demand pulses from the secondary side to the primary side;*

*the primary-side switch is turned on in response to the demand pulses conveyed from the secondary side to the primary side, wherein the determination of when to turn off the primary-side switch is originated on the primary side and not on the secondary side;*

*frequency with which the primary-side switch is turned on is adjusted by the demand pulses conveyed from the secondary side to the primary side to regulate the output voltage or the output current at the output port; and*

*the secondary side further comprises:*

*a first capacitor; and*

*a first rectifier poled to charge the first capacitor during forward power converter pulses of the flyback converter, wherein the demand pulses are generated using energy stored in the first capacitor.*

*49. The article of claim 18, wherein the primary side is configured to determine when to turn off the primary-side switch based on either (i) current flowing through the primary-side switch or (ii) a maximum duration for which the primary-side switch is allowed to stay on.*

*50. The article of claim 18, wherein the demand pulse generator is configured to adjust a frequency of turning on the primary-side switch to supply a desired amount of voltage or current to the output port in order to regulate the output port.*

*51. The article of claim 18, wherein the secondary side comprises:*

*a source configured to provide a reference signal; and*

*a secondary-side comparator configured to compare a feedback signal based on the output port voltage or current to the reference signal wherein the frequency of the demand pulses is responsive to the comparison between the feedback signal and the reference signal.*

*52. The article of claim 18, wherein:*

*the demand pulse generator is configured to generate a demand pulse when a feedback signal based on the output voltage or the output current is lower in magnitude than a magnitude of a reference signal such that the demand pulses regulate the output port by driving the feedback signal to match the reference signal;*

*the flyback converter regulates the output port to have the feedback signal match the reference signal;*

*frequency of the demand pulses generated by the demand pulse generator is greater than frequency of pulses initiated on the primary side that turn on the primary-side switch;*

*the demand pulse generator generates a demand pulse whenever a magnitude of the output voltage or the output current is below a magnitude of the output port's regulation voltage or regulation current;*

*the primary-side switch is turned on for a duration that is independent of duration of the demand pulse that caused the primary-side switch to be turned on;*

*the article is the flyback converter;*

*the demand pulse generator is configured to adjust a frequency of turning on the primary-side switch to supply a desired amount of voltage or current to the output port in order to regulate the output port; and*

*the secondary side comprises:*

*a source configured to provide a reference signal; and*

*a secondary-side comparator configured to compare a feedback signal based on the output port voltage or current to the reference signal wherein the frequency of the demand pulses is responsive to the comparison between the feedback signal and the reference signal.*

*53. The article of claim 52, wherein:*

*the secondary side further comprises a second capacitor, different from the first capacitor, and a second rectifier, different from the first rectifier, wherein flyback voltage of the power transformer is rectified by the second rectifier and charges the second capacitor to supply output voltage or current to the output port;*

*the secondary side is configured to charge the first capacitor during flyback pulses of the flyback converter;*

*the secondary side is configured to charge the first capacitor during forward power converter pulses of the flyback converter even if the output port is short-circuited;*

*feedback from the secondary side to the primary side for regulating the output voltage or the output current is provided solely by the demand pulses generated by the demand pulse generator;*

*the secondary-side comparator generates a comparator output;*

*the demand pulse generator comprises:*

*an oscillator configured to generate a stream of oscillator pulses independent of the comparator output; and*

*logic circuitry configured to (i) receive the comparator output and the stream of oscillator pulses and (ii) process the stream of oscillator pulses based on the comparator output to generate the demand pulses by selectively blocking certain oscillator pulses;*

*regulation of the output port is based solely on the demand pulses generated on the secondary side;*

*the power transformer is configured to transfer unipolar input power received at the input port to provide the output power at the output port;*

*the power transformer has a primary-side winding and a secondary-side winding;*

*the primary-side switch is connected in series with the primary-side winding of the power transformer;*

*the secondary-side winding of the power transformer is connected to the output port;*

*the primary-side magnetically coupled conductor is different from the primary-side winding of the power transformer;*

*the secondary-side magnetically coupled conductor is different from the secondary-side winding of the power transformer;*

*the primary side comprises a primary-side oscillator configured to generate one or more primary-side pulses;*

*the primary-side switch is configured to be turned on based on (i) the one or more primary-side pulses generated by the primary-side oscillator or (ii) the demand pulses received from the secondary side;*

*the primary side is configured to turn on the primary-side switch at power up, in order to transfer input power to the secondary side via the power transformer to power the demand pulse generator to generate the demand pulses; and*

*the secondary side does not generate pulses instructing the primary side to turn off the primary-side switch.*

*54. The article of claim 53, wherein*

*each demand pulse conveyed from the secondary side to the primary side has a leading edge; and*

*when a particular demand pulse results in a particular occurrence of the primary-side switch turning on, the particular occurrence of the primary-side switch turning on is in response to detecting the leading edge of the particular demand pulse independent of any other demand pulses conveyed from the secondary side to the primary side and independent of any other pulse edges appearing on the primary side.*

*55. The article of claim 53, wherein the determination of when to turn off the primary-side switch is always originated on the primary side and never on the secondary side.*

*56. The article of claim 53, wherein, unless the primary-side switch is already on due to a pulse generated on the primary side, the primary-side switch is turned on once for each different demand pulse.*

*57. The article of claim 53, wherein the primary side is configured to avoid premature turnoff of the primary-side switch due to capacitive charging of the primary-side switch.*

*58. The article of claim 53, wherein the primary side is configured to establish a maximum duration for which the primary-side switch is allowed to stay on.*

*59. The article of claim 53, wherein the primary side further comprises a bias winding configured to assist in powering the primary side.*

*60. The article of claim 53, wherein the article further comprises a load connected to the output port and configured to be powered by the flyback converter.*

*61. The article of claim 53, wherein the primary side is configured to determine when to turn off the primary-side switch based on either (i) current flowing through the primary-side switch or (ii) a maximum duration for which the primary-side switch is allowed to stay on.*

* * * * *